United States Patent [19]

Markwitz

[11] 4,317,202

[45] Feb. 23, 1982

[54] CIRCUIT ARRANGEMENT FOR CORRECTION OF DATA

[75] Inventor: Wernhard Markwitz, Munich, Fed. Rep. of Germany

[73] Assignee: Siemens Aktiengesellschaft, Berlin and Munich, Fed. Rep. of Germany

[21] Appl. No.: 95,221

[22] Filed: Nov. 19, 1979

[30] Foreign Application Priority Data

Nov. 28, 1978 [DE] Fed. Rep. of Germany ....... 2851436

[51] Int. Cl.$^3$ ............................................. G06F 11/12
[52] U.S. Cl. .......................................... 371/43; 371/44
[58] Field of Search .............................. 371/43, 44, 45

[56] References Cited

U.S. PATENT DOCUMENTS

| | | | |
|---|---|---|---|
| 3,402,393 | 9/1968 | Massey | 371/43 |
| 3,571,795 | 3/1971 | Tong | 371/44 |
| 3,605,090 | 9/1971 | Burton | 371/43 |
| 3,718,905 | 2/1973 | Tong | 371/44 |
| 4,193,062 | 3/1980 | En | 371/43 |

OTHER PUBLICATIONS

"Convolutional Coding for Channels with Memory", *IEEE Trans. on Information Theory*, vol. IT-14, No. 5, 9-1968, pp. 618-626.

*Primary Examiner*—Jerry Smith
*Attorney, Agent, or Firm*—Hill, Van Santen, Steadman, Chiara & Simpson

[57] ABSTRACT

Circuit arrangement for the correction of data transmitted over a communication channel incorporates a shift register and a parity stage at the transmission side of the channel for generating parity bits, and similar equipment located at the reception side of the channel for generating similar parity bits. The parity bits are compared to provide syndrome signals, and the syndrome signals are stored in a syndrome shift register having a plurality of taps. A majority stage is effective to make corrections in the transmitted data when a majority of the syndrome signals at the taps of the syndrome register indicate an error condition. The taps of the shift registers employed for the parity generation and the taps of the syndrome shift register are spaced at unequal intervals. Four, six or eight taps are employed.

6 Claims, 8 Drawing Figures

CIRCUIT ARRANGEMENT FOR CORRECTION OF DATA

FIELD OF THE INVENTION

The present invention relates to a circuit for the correction of transmitted data, and more particularly to a circuit employing a shift register having a plurality of taps at the transmission side for generating parity bits in accordance with a recurrent code, and a corresponding shift register at the reception side for effecting corrections to data.

PRIOR ART

Error correcting coding techniques are described in IEEE Transactions on Information Theory, Vol. IT-14, No. 5, September, 1968, pages 618 through 620. The system as described therein employs a shift register at the transmission side, which shift register has a plurality of equally spaced taps. Signals at each of the taps are summed to produce a parity bit which is transmitted along the data. At the receiving side, the received data is fed into a shift register which is a replica of the shift at the transmission side, with a plurality of taps at equally spaced intervals. Signals available at each of the taps, together with the parity signal, are summed, and fed into another shift register having a plurality of taps at equally spaced intervals. The outputs of the taps are examined, and a decision is made, based thereon, as to whether the data bits being received are correct. If it is determined that the data bits are incorrect, the data is corrected.

Although this system is effective for some purposes, difficulties arise when errors in transmission result from trunk group disruptions and also the distribution of random noise between trunk group disruptions. Particularly because the known apparatus relies on a number of information bits and parity bits which occur in close timed proximity with each other, a complete error correction is often not possible. p It is therefore desirable to provide a system which is able to correct errors due to trunk group disruptions and random noise, when the random noise occurs between the trunk group disruptions.

BRIEF DESCRIPTION OF THE INVENTION

It is a principal object of the present invention to provide a circuit capable of correcting errors caused by trunk group disruptions and random noise, when such random noise occurs between successive trunk group disruptions.

The present invention is able to achieve this object by employing a shift register having a plurality of taps which are not spaced at uniform intervals. When four, six or eight taps are provided, at least $15x$, $41x$ or $89x$ cells or stages are provided, respectively, for the total capacity of the shift register, where $x$ specifies the number of information bits which characteristically belong to a single trunk group disruption.

When a shift register is employed having four taps, the intervals between the four taps are spaced according to $4x$, $2x$ and $x$. When six taps are provided, they are spaced according to $8x$, $5x$, $4x$, $2x$ and $x$. When eight taps are provided, the taps are spaced according to $14x$, $10x$, $8x$, $5x$, $4x$, $2x$ and $x$.

A shift register is employed on the receiver side and the signals present at a plurality of taps are summed and compared with the incoming parity bit to produce a syndrome signal. Syndrome signals are stored in a syndrome register which is constructed as a shift register with taps arranged in the mirror image of the taps of the first shift register. A majority stage examines the taps of the syndrome register and sends a correcting signal to the correcting stage, if necessary.

The circuit arrangement of the present invention permits a correction of errors which are caused due to trunk group disruptions when random noise is also present between successive trunk group disruptions. This error correction is possible because the information and parity bits which are employed for the syndrome formation have a minimum spacing interval of approximately $x$ bits. It is therefore possible to correct errors which affect bits which are relatively close together in time.

A further advantage of the present invention arises from the fact that it is possible to select the number $x$ according to the length of the trunk group disruptions which are expected. This was not possible in previously known systems, where the number $x$ was required to be selected such that a zone which was largely disruption-free existed between trunk group disruptions, such zone being $3x+1$ bits. Since this is not a necessary condition in the present invention, the number $x$ can be adapted in a more optimum manner to the communications channel being employed.

When a shift register having four taps is employed, the taps are spaced such that the information present at the taps corresponds to $1$, $4x+1$, $6x+1$, and $7x+1$. When six taps are employed, the taps are spaced such that the information corresponds to $1$, $8x+1$, $13x+1$, $17x+1$, $19x+1$ and $20x+1$. When eight taps are employed, the information corresponds to $1$, $14x+1$, $24x+1$, $32x+1$, $37x+1$, $41x+1$, $43x+1$, and $44x+1$. By means of this feature, at least $x-1$ information or parity bits lie between the information bits and the parity bits employed for the syndrome formation. When $x=100$, for example, an interval of 99 information or parity bits is interposed between the corresponding information and parity bits.

It is possible to employ shift registers having tap spacing which deviates from that specified above, but such deviation should not be more than $\pm 10\%$ from the tap positions specified, so as to not impair the error correction significantly, even when the tap spacing is not optimum.

BRIEF DESCRIPTION OF THE DRAWINGS

Reference will now be made to the accompanying drawings in which.

DETAILED DESCRIPTION OF THE PRIOR ART

Figure 1:
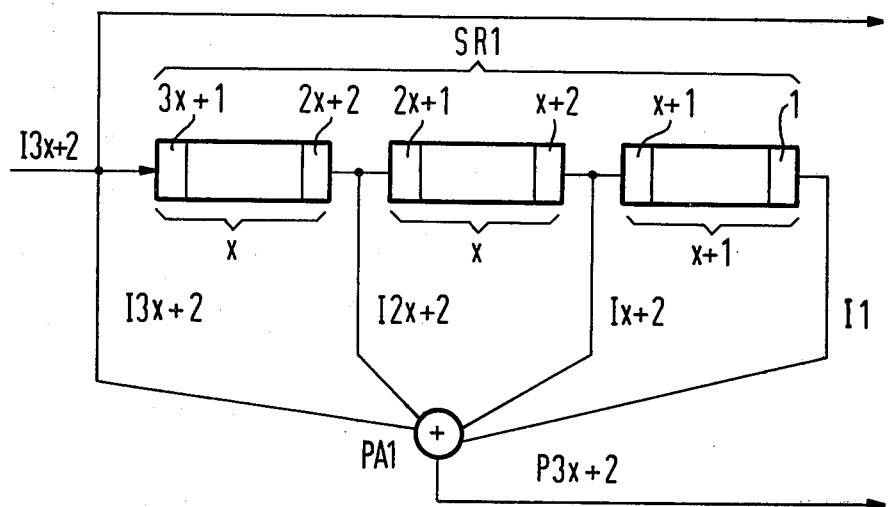
FIGS. 1 and 2 illustrate the known circuit arrangement, described in the aforementioned article in IEEE Transactions on Information Theory.
Figure 2:
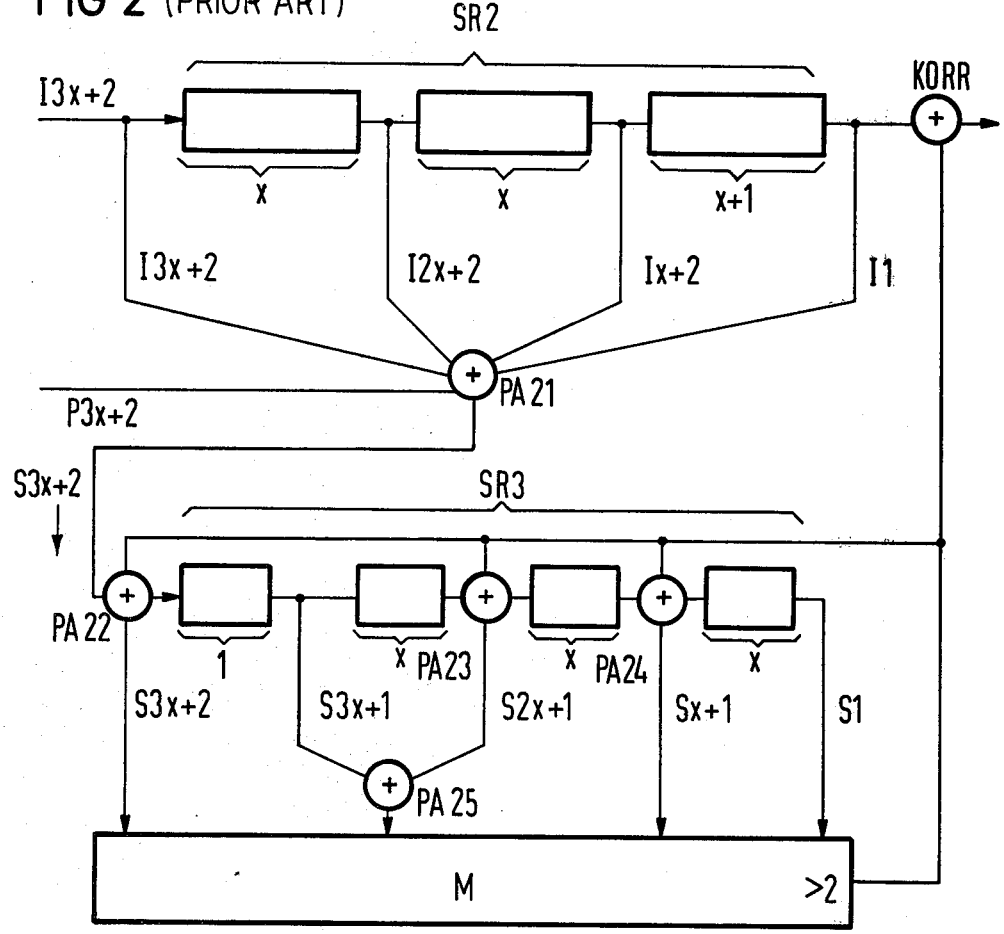

Referring now to FIGS. 1 and 2, FIG. 1 illustrates the circuit present at the transmission side of a communication channel, to which a sequence of information bits I is supplied. As illustrated, an information bit $I3x+2$ is being supplied to the input, and information bit $I1$ is emitted from the output taps of the shift register SR1. The shift register is provided with two intermediate taps, at which are present information bits $Ix+2$ and $I2x30\ 2$.

The input signal, and signals from the three taps of the shift register are all connected to a parity stage PA1, which generates an output parity bit $P3x+2$.

FIG. 2 illustrates circuitry present at the reception side of the communication channel. A shift register SR2 is provided, having taps arranged in the identical manner as the shift register SR1. The input signal, and signals from the three taps of the shift register are connected to the parity stage PA21, together with the parity bit $P3x+2$. The output of the parity stage PA21 is a syndrome bit $S3x+2$, which is connected through a parity unit PA22 to the input of a shift register SR3. The shift register SR3 has a total number of stages equal to that of SR1 and SR2, namely, $3x+1$. They are provided with taps after one stage, $x+1$, $2x+1$ and $3x+1$. Parity stages PA23 and PA24 are interconnected between the successive sections which are x stages in length. At the taps of the shift register SR3, are emitted syndromes S1, $Sx+1$, $S2x+1$ and $S3x+1$. The syndromes $S2x+1$ and $S3x+1$ are supplied to a parity stage PA25, and the output of this stage, together with the other syndromes, including the input $S3x+2$, are supplied as inputs to a majority stage M. When three or four of the four inputs to the majority stage are 1's, the majority stage emits a 1 signal for effecting a correction by the correction unit KORR. The correction signal is also applied as an input to the parity stages PA22, PA23 and PA24, so that an occurring error is corrected so that it is not disruptive in later evaluation of the syndromes.

The formation of four of the syndromes, by the apparatus of FIG. 2, are described by the following equation system:

$$S3x+2 = e^{I1} + e^{Ix+2} + e^{I2x+2} + e^{I3x+2} + e^{P3x+2}$$

$$S2x+1 + S3x+1 = e^{I1} + e^{I2x+1} + e^{I3x+1} + e^{P3x+1}$$

$$Sx+1 = e^{I1} + e^{Ix+1} + e^{Px+1}$$

$$S1 = e^{I1} + e^{P1}$$

Equation System No. 1

In Equation System No. 1, errors in information bits are indicated by $e^I$, and errors in parity bits are indicated by $e^P$. All syndromes depend on the error $e^{I1}$ of the information bit I1. Other erroneous bits occur only in a single equation. When three or four of the syndrome signals indicate an error, it is assumed that the information bit I1 is in error. When only one or two of the four syndromes express errors, it is assumed that the error is not caused by the information bit I1 but by other information or parity bits. From Equation System No. 1, it can be seen that when there is at least $3x+1$ non-erroneous bits between individual trunk group disruptions, errors can be corrected. If, for example, the bits 1 through x are disrupted, then bit I1 is first corrected on the basis of Equation System No. 1, and succeeding bits are corrected in succession, in accordance with the assumption that $3x+1$ error-free information and parity bits are available. When this assumption cannot be realized, however, as when random noise appears between successive trunk group disruptions, the circuit of FIGS. 1 and 2 cannot make appropriate corrections.

DESCRIPTION OF THE PREFERRED EMBODIMENTS OF THE INVENTION

Figure 3:
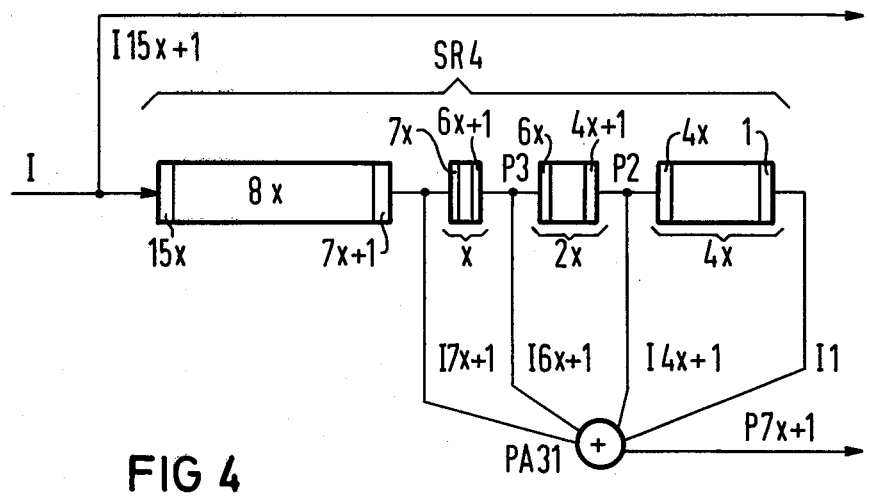
FIGS. 3 and 4 illustrate a circuit constructed in accordance with an illustrative embodiment of the present invention, employing shift registers with four taps.
Figure 4:
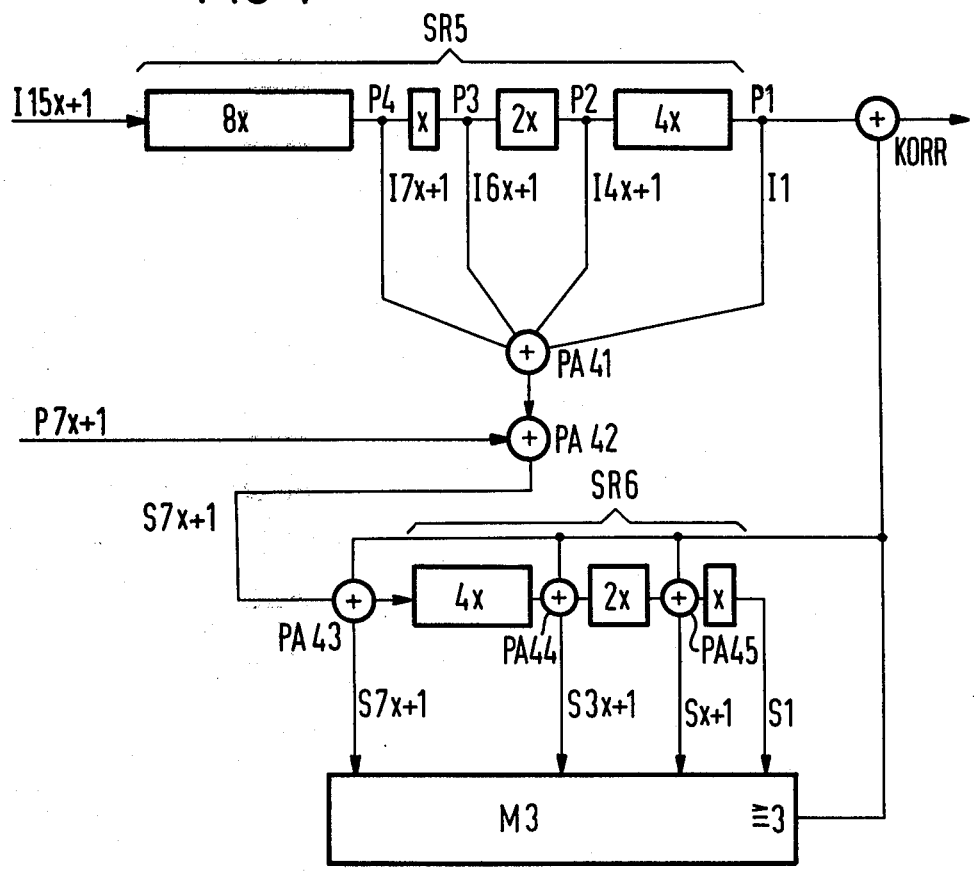

FIGS. 3 and 4 illustrate circuitry employed with a first illustrative embodiment of the present invention. FIG. 3 illustrates circuitry employed at the transmission side of a communication channel, for coding a communication according to a recurrent code with a code rate $\frac{1}{2}$. A shift register SR4 is employed, comprising a total of 15x cells or stages. Beginning with the right-hand end or output stage of the shift register, the cells are numbered, beginning with 1 up to 15x. Taps are available at $I4x+1$, $I6x+1$, I1, and $I7x+1$. All of these taps are connected as inputs to a parity stage PA31, which produces as an output parity bit $P7x+1$. From FIG. 3 it can be seen that successive taps of the shift register are separated by exactly x, 2x, or 4x, respectively.

FIG. 4 illustrates the circuitry present at the reception side of the communication channel. A shift register SR5 is employed which is identical to SR4, and is provided with sections having stages of 8x, x, 2x, and 4x. At a particular time, an information bit $I15x+1$ is being supplied to the input of the shift register SR5, and at this time, information bits I1, $I4x+1$, $I6x+1$, and $I7x+1$ are provided at the taps and are supplied as inputs to a parity stage PA41. The output of PA41 is connected as an input to a parity stage PA42 which also receives the parity bit $P7x+1$, and produces a syndrome signal $S7x+1$. When the parity bit $P7x+1$ is equal to the output of the parity stage PA41, the syndrome $S7x+1$ indicates no error. If these signals are not identical, however, the syndrome signal indicates an error.

The syndrome register SR6 employs a total of 7x stages, with taps arranged in the same intervals, namely, 4x, 2x and x, as the shift registers SR4 and SR5, but mirrored with respect to the shift direction. At the time under consideration, the syndromes S1, $Sx+1$, $S3x+1$ and $S7x+1$ are emitted, and connected as inputs to the majority stage M3. A "1" signal is produced by the majority stage if three or four of the syndromes are 1's. When only one or two syndromes are 1's, a zero is emitted by the majority stage M3. The output of the majority stage is connected as an input to the correction stage KORR, and also to inputs of parity stages PA43, PA44 and PA45, which are connected respectively to the inputs of the sections of the shift register SR6. When the majority stage M3 emits a "1" signal, the information bit is corrected, and the syndromes are also corrected by means of parity stages PA43, PA44 and PA45. The syndromes produced in FIG. 4 are produced in accordance with Equation System No. 2:

$$S7x+1 = e^{I1} + e^{I4x+1} + e^{I6x+1} e^{I7x+1} + e^{P7x+1}$$

$$S3x+1 = e^{I1} + e^{I2x+1} + e^{I3x+1} e^{P3x+1}$$

$$Sx+1 = e^{I1} + e^{Ix+1} + e^{Px+1}$$

$$S1 = e^{I1} + e^{P1}$$

Equation System No. 2

From Equation System No. 2, it can be seen that the syndromes are dependent on the information bits, parity bits, and their errors.

In the formation of the syndrome S7x+1, the information bit I1 is emitted from tap P1 at the output of SR5. At a time which was 4x bits earlier, however, this same information bit I1 was emitted from tap P2 and at the same time, I2x+1 was emitted from tap P3, and I3x+1 was emitted from tap P4. These three information bits, together with parity bit P3x+1, influence the syndrome S3x+1. The syndrome Sx+1 takes into consideration states which existed 2x bits earlier, when information bit I1 was emitted from tap P3 and information bit Ix+1 was emitted from tap P4, and when parity bit Px+1 was received. The syndrome S1 is dependent on potential errors of the information bit I1 and the parity bit P1.

It is apparent from Equation System No. 2 that the information and parity bits which are employed for syndrome formation are separated by at least x−1 bits. Note that the parity bit P7x+1 and the information bit I15x+1 are consecutive, so that the parity bit is separated from information bit I7x+1 by 8x−1 bits.

Figure 5:
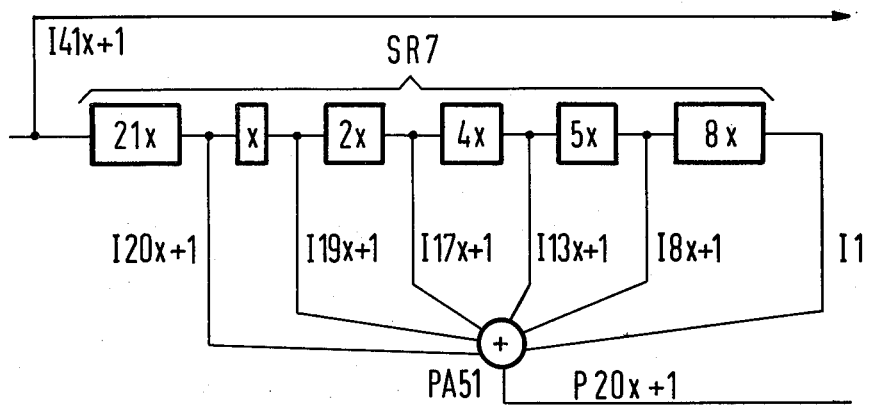
FIGS. 5 and 6 illustrate a circuit constructed in accordance with another embodiment of the present invention, using shift registers with six taps.
Figure 6:
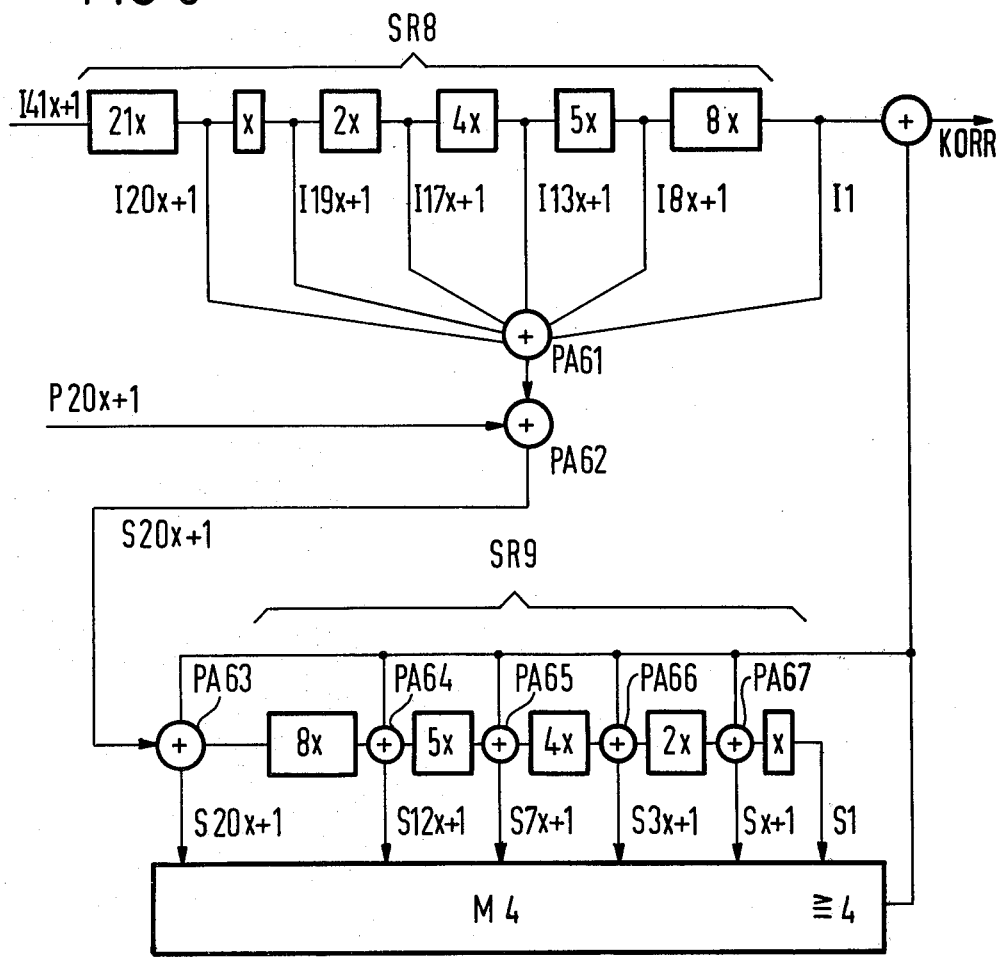

FIGS. 5 and 6 illustrate another embodiment of the present invention, incorporating a shift register with six taps. In FIG. 5, a shift register SR7 is employed comprising a total of 41x cells or stages, with output taps spaced by 8x, 5x, 4x, 2x, and x stages. The taps are connected as inputs to a parity stage PA51, which produces a parity bit P20x+1.

FIG. 6 illustrates circuitry present at the reception side of the communication channel, and illustrates a point in time in which information bits I41x+1 is supplied as an input, together with parity P20x+1. The shift register SR8 employed at the reception side is identical to the shift register SR7, and the corresponding taps are connected at inputs to a parity unit PA61, the output of which is connected as an input to a parity unit PA62, together with parity bit P20x+1. The output of the parity unit PA62 is syndrome S20x+1, which is connected as an input to the syndrome register SR9. The syndrome register SR9 has 20x cells or stages, divided into units of 8x, 5x, 4x, 2x and x. These units are connected in reverse order of corresponding units of SR7 and SR8, to form the mirror image of these registers. Parity units 63-67 are connected as inputs to each of the units of SR9, for correcting syndrome information as required.

Six syndromes at the input and taps of the syndrome register are connected as inputs to the majority stage M4. When four or five of the syndromes are 1's, a 1 is produced at the output of the majority stage, which causes a correction stage KORR to correct information bits, and corrects syndromes via parity units PA63-PA67. When three or less of the syndromes are 1's, a zero is produced at the output of the majority unit M4, and no signal correction is effected.

Figure 7:
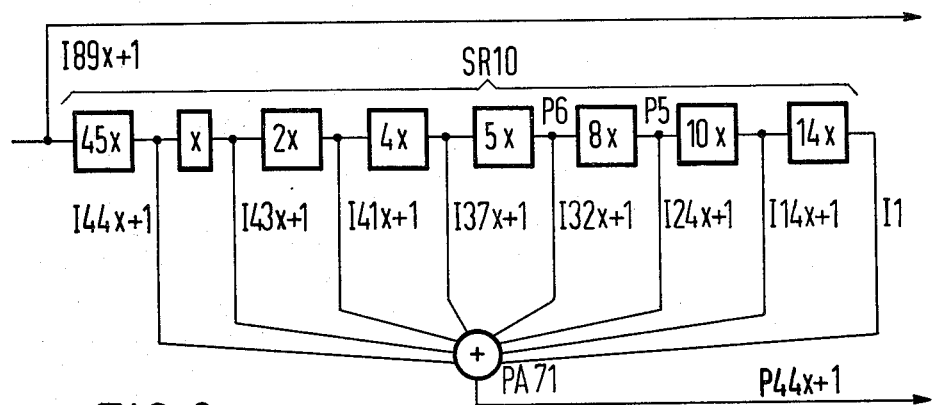
FIGS. 7 and 8 illustrate a circuit arrangement in accordance with a further embodiment of the present invention, employing shift registers with eight taps.
Figure 8:
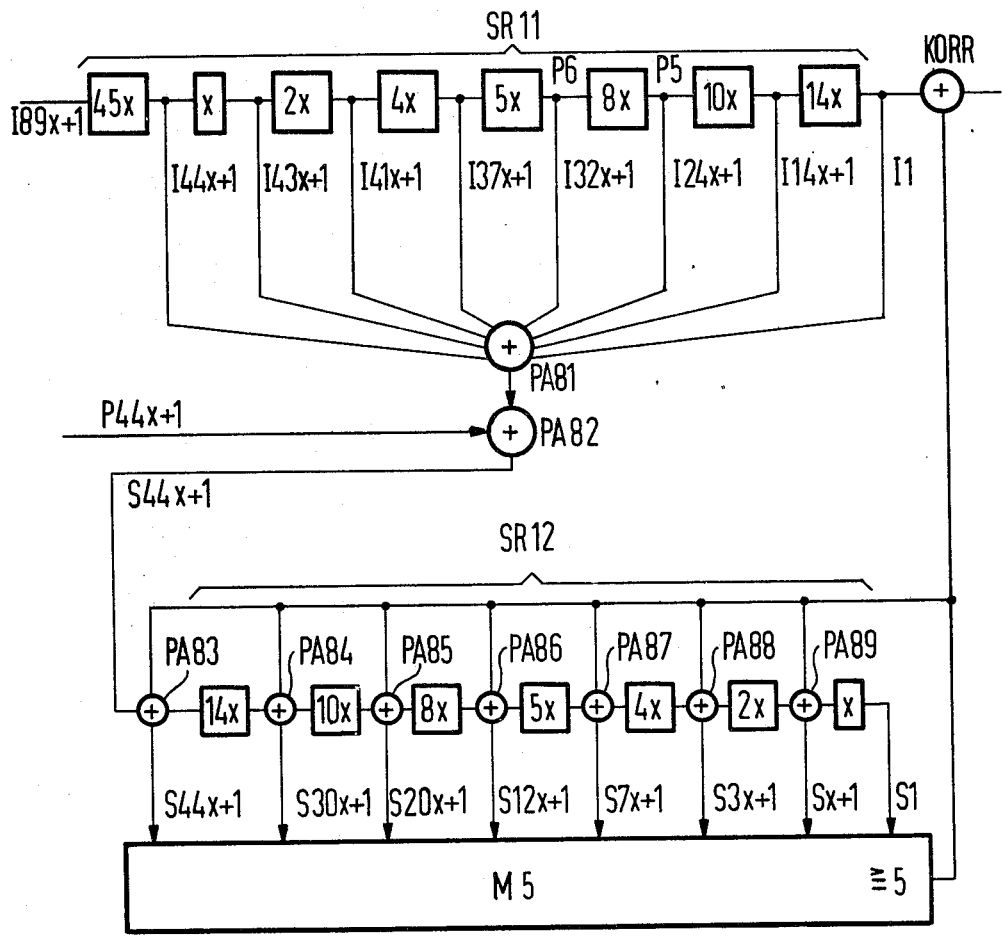

FIGS. 7 and 8 illustrate another embodiment of the present invention, incorporating shift registers with eight taps. FIG. 7 illustrates circuitry present at the transmission side of the communication channel, including a shift register SR10, having taps spaced at intervals of x, 2x, 4x, 5x, 8x, 10x and 14x, as illustrated. The first tap is located 45x after the input. All the taps are connected as inputs to a parity unit PA71, which produces a parity bit P44x+1.

FIG. 8 shows circuitry present at the reception side of the communication channel. A shift register SR11 is identical to SR10, and receives the information bits. The taps of SR11 are connected as inputs to a parity unit PA81, which produces a signal supplied to a parity unit PA82 as an input. PA82 receives as a second input the parity bit P44x+1, and produces a syndrome output S44+1. The syndrome is connected to the input of the syndrome register SR12, which is a shift register made up of units having a number of cells or stages equal to x, 2x, 4x, 5x, 8x, 10x and 14x, connected in reverse order to form the mirror image of the corresponding parts of shift registers SR10 and SR11. Each of the units has a parity unit PA83-PA89 connected to its input, for correcting syndrome information when necessary. The taps of the syndrome register are connected as inputs of a majority unit M5, which produces a 1 output when five or more of the syndromes are 1's. When four or less of the syndromes are 1, a zero is produced at the output of M5. The output of M5 is connected to the correction stage KORR and to the parity units PA83-PA89, to correct information bits and to correct syndromes, in the same manner as in the other embodiments described above.

From the foregoing, it is apparent that the present invention offers a simple and effective means for correcting errors in communication channels. When shift registers are employed having four, six or eight taps, the most favorable conditions for error correction are realized. This is because one can rely on relatively large intervals between information and parity bits which influence the respective syndromes, as pointed out in connection with Equation System No. 2.

It is also contemplated in the present invention to provide shift registers with intervals between successive taps which are somewhat different from those described above. For example, in connection with the apparatus illustrated in FIGS. 3 and 4, if it were desired to employ 2x+50 cells or stages between taps P2 and P3, the syndromes would be determined by the equations of Equation System No. 3:

$$S7x+51 = e^{I1} + e^{I4x+1} + e^{I6x+51} + e^{I7x+5-1} + e^{P7x+51}$$

$$S3x+51 = e^{I1} + e^{I2x+1} + e^{I3x+51} + e^{P3x+51}$$

$$Sx+1 = e^{I1} + e^{Ix+1} + e^{Px+1}$$

$$S1 = e^{I1} = e^{P1}$$

Equation System No. 3

Whereas x−1 bits lie between the information bits I4x+1 and I3x+1 (Equation System No. 2), a total of x−51 bits lie between I4x+1 and I3x+51 (Equation System No. 3). If x is seen to be equal to 100, then Equation System No. 2 gives a total of 99 bits between information bits I41 and I301 (Equation System No. 2), whereas only 49 bits lie between information bits I401 and I351 (Equation System No. 3). Thus, the intervals between individual bits have been reduced. In order that these intervals are not reduced too greatly, it is expedient that the intervals between taps P2 and 3 differ from 2x by no more than 10%, e.g., between 180 and 220 (with x equal to 100). The same logic applies to the other intervals of all of the embodiments. As long as the intervals differ by no more than about 10% from the optimum, as illustrated in FIGS. 3-8, a very high efficiency in error correction is still possible.

It will be apparent that various modifications and additions may be made in the apparatus and methods of the present invention without departing from the essential features of novelty thereof, which are intended to be defined and secured by the appended claims.

What is claimed is:

1. A circuit for correcting x bits of data transmitted in a communication channel comprising, in combination, a first shift register located at the transmission side of said communication channel, said first shift register having a plurality of taps, a first parity stage having inputs connected to said taps for producing parity bits coded according to a recurrent code, a second shift register located at the receiving side of said communication channel, a second parity stage connected to receive signals from the taps of said second shift register whereby sequences of information bits and parity bits are transmitted from the transmission side to the receiving side of said communication channel, a syndrome shift register connected to said second shift register for storing a plurality of syndrome signals and for providing syndrome signals coincidently at a plurality of taps, and a majority stage connected to receive input signals from the taps of said syndrome register for producing a correction signal for correcting said data, said first register being divided into two parts, a first part being defined by those cells which are disposed between the taps connected to said first parity stage, said first part being connected to said parity stage with four taps, the second part of said first shift register consisting of least 8x cells, the taps of said first part being spaced by approximately x, 2x, and 4x, said second shift register also being divided into two parts each identical to said first shift register, said syndrome register consisting of at least 7x cells whose taps are disposed at the same intervals as in the first part of said first shift register, the taps being arranged in the inverted mirror image of said first shift register with respect to the transfer direction.

2. Apparatus according to claim 1, wherein the number of cells between the taps of the first part of said first shift register is within plus or minus 10% of x, 2x and 4x, respectively.

3. A circuit for correcting x bits of data transmitted in a communication channel comprising, in combination, a first shift register located at the transmission side of said communication channel, said first shift register having a plurality of taps, a first parity stage having inputs connected to said taps for producing parity bits coded according to a recurrent code, a second shift register located at the receiving side of said communication channel, a second parity stage connected to receive signals from the taps of said second shift register whereby sequences of information bits and parity bits are transmitted from the transmission side to the receiving side of said communication channel, a syndrome shift register connected to said second shift register for storing a plurality of syndrome signals and for providing syndrome signals coincidently at a plurality of taps, and a majority stage connected to receive input signals from the taps of said syndrome register for producing a correction signal for correcting said data, said first register being divided into two parts, a first part being defined by those cells which are disposed between the taps connected to said first parity stage, said first part being connected to said parity stage with six taps, the second part of said first shift register consisting of least 21x cells, the taps of said first part being spaced by approximately x, 2x, 4x, 5x and 8x said second shift register also being divided into two parts each identical to said first shift register, said syndrome register consisting of at least 20x cells whose taps are disposed at the same intervals as in the first part of said first shift register, the taps being arranged in the inverted mirror image of said first shift register with respect to the transfer direction.

4. Apparatus according to claim 1, wherein the number of cells between the taps of the first part of said first shift register is within plus or minus 10% of x, 2x 4x, 5x and 8x, respectively.

5. A circuit for correcting x bits of data transmitted in a communication channel comprising, in combination, a first shift register located at the transmission side of said communication channel, said first shift register having a plurality of taps, a first parity stage having inputs connected to said taps for producing parity bits coded according to a recurrent code, a second shift register located at the receiving side of said communication channel, a second parity stage connected to receive signals from the taps of said second shift register whereby sequences of information bits and parity bits are transmitted from the transmission side to the receiving side of said communication channel, a syndrome shift register connected to said second shift register for storing a plurality of syndrome signals and for providing syndrome signals coincidently at a plurality of taps, and a majority stage connected to receive input signals from the taps of said syndrome register for producing a correction signal for correcting said data, said first register being divided into two parts, a first part being defined by those cells which are disposed between the taps connected to said first parity stage, said first part being connected to said parity stage with eight taps, the second part of said first shift register consisting of least 45x cells, the taps of said first part being spaced by approximately x, 2x, 4x, 5x, 8x, 10x and 14x, said second shift register also being divided into two parts each identical to said first shift register, said syndrome register consisting of at least 44x cells whose taps are disposed at the same intervals as in the first part of said first shift register, the taps being arranged in the inverted mirror image of said first shift register with respect to the transfer direction.

6. Apparatus according to claim 5, wherein the number of cells between the taps of the first part of said first shift register is within plus or minus 10% of x, 2x, 4x, 5x, 8x 10x and 14x, respectively.

* * * * *